(12) United States Patent
Webber

(10) Patent No.: US 9,273,811 B1
(45) Date of Patent: Mar. 1, 2016

(54) HOSE COUPLING WITH A SEPARATE SLEEVE AND COLLAR

(71) Applicant: Jade Development, L.L.C., Cascade, IA (US)

(72) Inventor: David J. Webber, Cascade, IA (US)

(73) Assignee: Jade Development, L.L.C., Cascade, IA (US)

( * ) Notice: Subject to any disclaimer, the term of this patent is extended or adjusted under 35 U.S.C. 154(b) by 113 days.

(21) Appl. No.: 13/906,559

(22) Filed: May 31, 2013

Related U.S. Application Data

(60) Provisional application No. 61/662,985, filed on Jun. 22, 2012, provisional application No. 61/677,903, filed on Jul. 31, 2012.

(51) Int. Cl.
*F16L 33/00* (2006.01)
*F16L 33/207* (2006.01)

(52) U.S. Cl.
CPC .................................. *F16L 33/2071* (2013.01)

(58) Field of Classification Search
CPC ........................... F16L 33/2071; F16L 33/2078
USPC ......... 285/259, 242, 253, 257, 239, 241, 252, 285/367, 365, 411, 410
See application file for complete search history.

(56) References Cited

U.S. PATENT DOCUMENTS

| | | | |
|---|---|---|---|
| 197,560 A * | 11/1877 | Meehan | 285/253 |
| 237,324 A * | 2/1881 | Reynolds | 285/253 |
| 533,419 A * | 1/1895 | Winkler | 285/253 |
| 714,243 A | 11/1902 | Sargent, Jr. | |
| 1,994,784 A * | 3/1935 | Porzel | 285/239 |
| 1,996,855 A * | 4/1935 | Cheswright | 285/239 |
| 3,687,491 A * | 8/1972 | Marshall | 285/242 |
| 4,754,994 A * | 7/1988 | Melzer et al. | 285/259 |
| 5,498,043 A * | 3/1996 | Goldenberg | 285/242 |
| 6,439,617 B1 * | 8/2002 | Boer et al. | 285/256 |
| 2007/0241555 A1 | 10/2007 | Welch | |
| 2010/0102551 A1* | 4/2010 | Zeiber | 285/253 |
| 2011/0025048 A1* | 2/2011 | Webster et al. | 285/222.1 |

FOREIGN PATENT DOCUMENTS

DE          3627274 A1 *     2/1988

* cited by examiner

*Primary Examiner* — David E Bochna
*Assistant Examiner* — James Linford
(74) *Attorney, Agent, or Firm* — Jason R. Sytsma; Shuttleworth & Ingersoll, PLC

(57) ABSTRACT

The hose coupler has a sleeve defining a passageway between a first hose section and a second hose section, and includes a plurality of barbs each having an angled surface. In an embodiment, a collar can be fitted over the hose after it is pulled up onto the sleeve. The collar also has a plurality of barbs with angled surfaces corresponding to the angle of the barbs on the sleeve. The collar is adapted to substantially surround the first hose section disposed over the plurality of the barbs on the sleeve and the each barb on the sleeve generally aligns with the each barb on the collar.

10 Claims, 11 Drawing Sheets

HOSE COUPLING WITH A SEPARATE SLEEVE AND COLLAR

This application claims priority to U.S. Patent Application No. 61/662,985 filed Jun. 22, 2012 and U.S. Application No. 61/677,903 filed Jul. 31, 2012, which applications are incorporated by reference herein.

The present invention is directed toward a hose coupling, and more specifically toward a field replaceable hose coupling for a drag-hose fertilizer conduit.

BACKGROUND

Liquid manure application equipment, like drag hoses are usually provided with hoses for passage of the liquid manure. Typically, these hoses are attached at one end to a manure spreader or the like and attached to the other end to a pump or a hose real. The manure spreader is then pulled around the field by a tractor with the hose dragging behind along the ground. As imagined, hoses tend to leak or burst from the being dragged along an abrasive surface. When this happens, the hose needs s back together as quickly as possible to minimize manure runoff.

SUMMARY

A hose coupler is provided. The hose coupler has a sleeve defining a passageway between a first hose section and a second hose section, and includes a plurality of barbs each having an angled surface. In an embodiment, a collar can be fitted over the hose after it is pulled up onto the sleeve. The collar also has a plurality of barbs with angled surfaces corresponding to the angle of the barbs on the sleeve. The collar is adapted to substantially surround the first hose section disposed over the plurality of the barbs on the sleeve and the each barb on the sleeve generally aligns with the each barb on the collar.

DETAILED DESCRIPTION OF THE INVENTION

In accordance with a first embodiment of the present disclosure, a field changeable hose coupler is provided, which allows a single operator to repair quickly a damaged hose by coupling two hose ends together. An exemplary first embodiment of a hose coupler 100 according to the present disclosure is illustrated in the FIGS. 1-2.

Figure 1A:
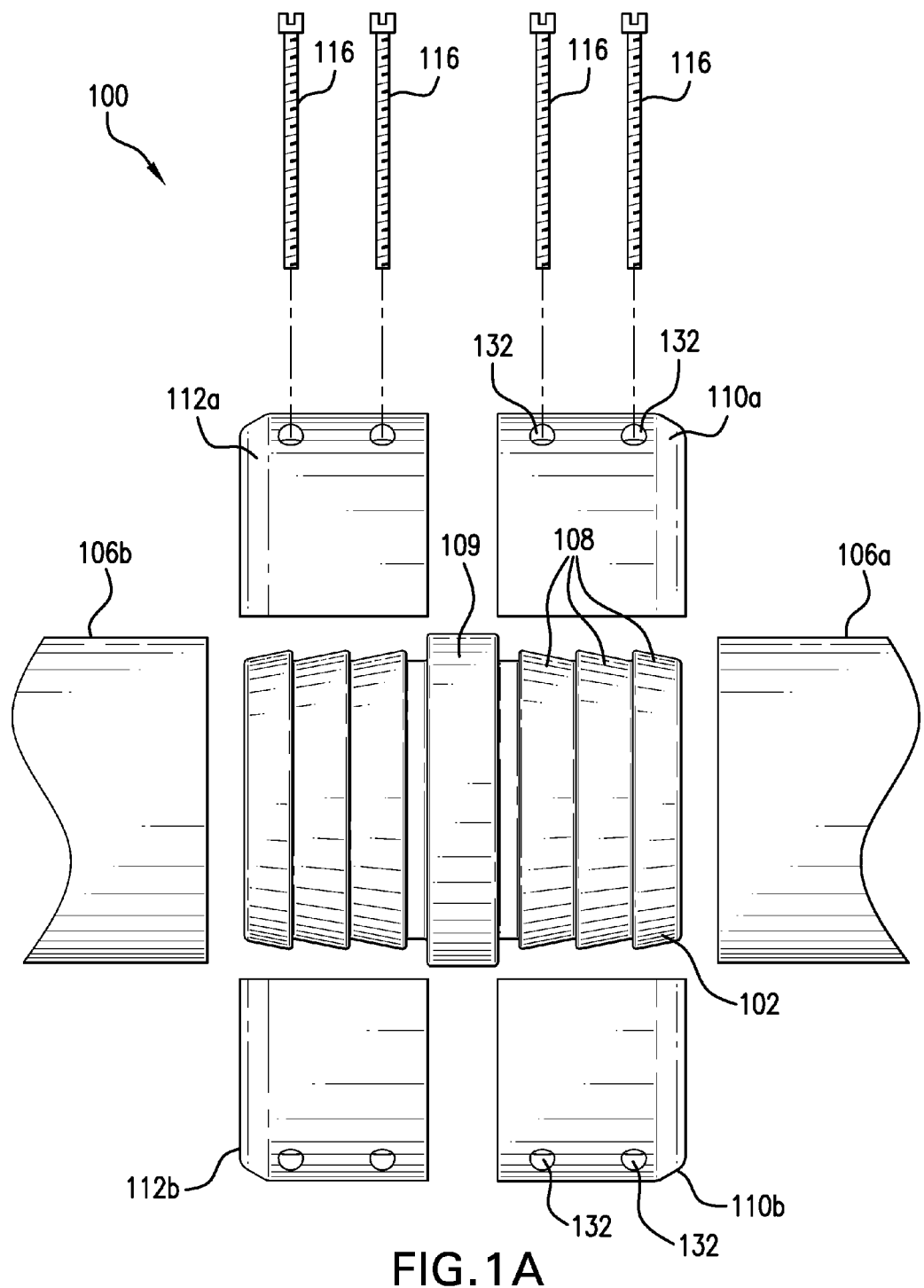
FIG. 1A is a front side view of a hose coupler according to the present invention during an initial stage of assembly.
Figure 1B:
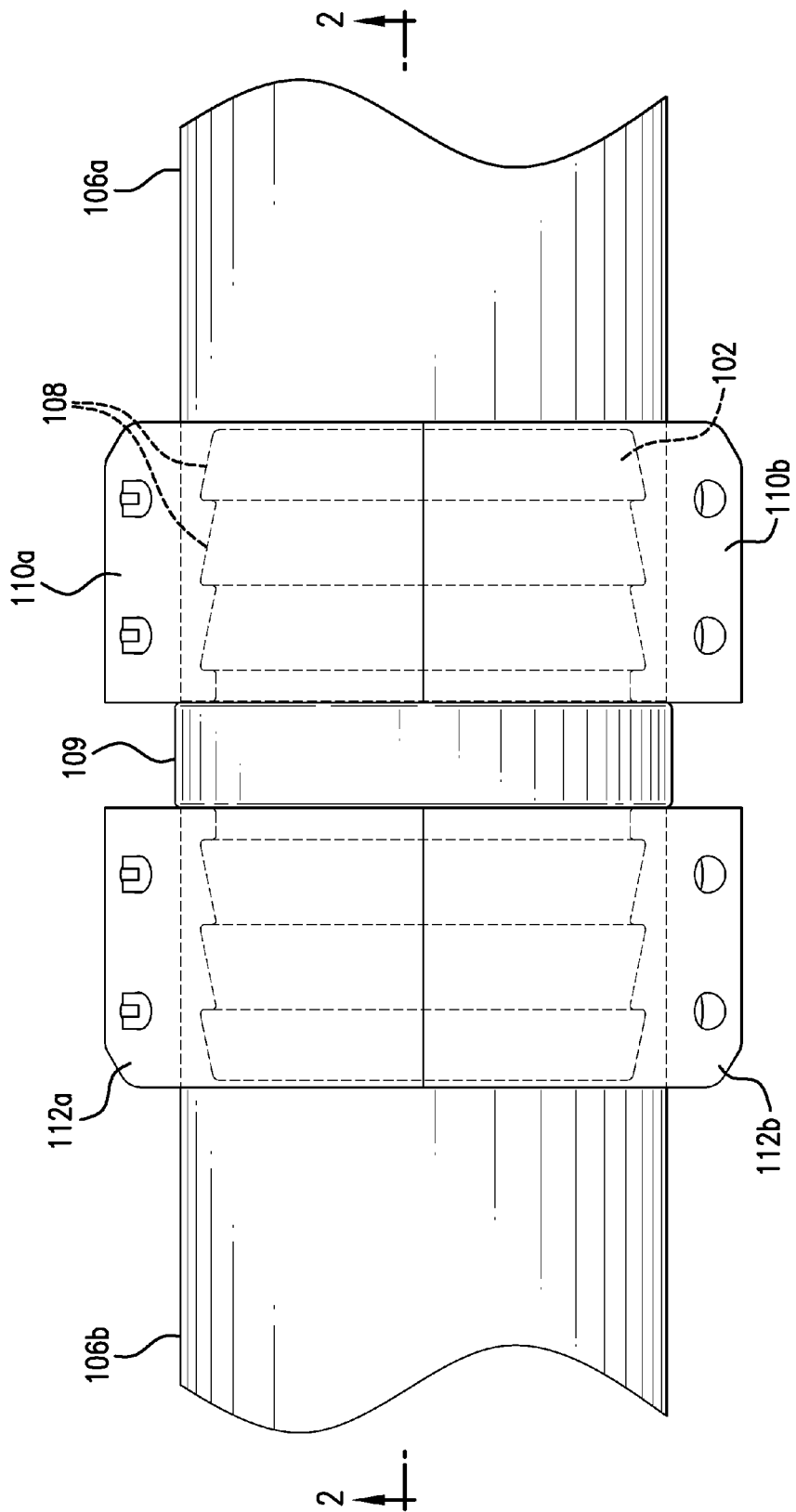
FIG. 1B is a front side view of the hose coupler of FIG. 1A during a final stage of assembly.
Figure 2:
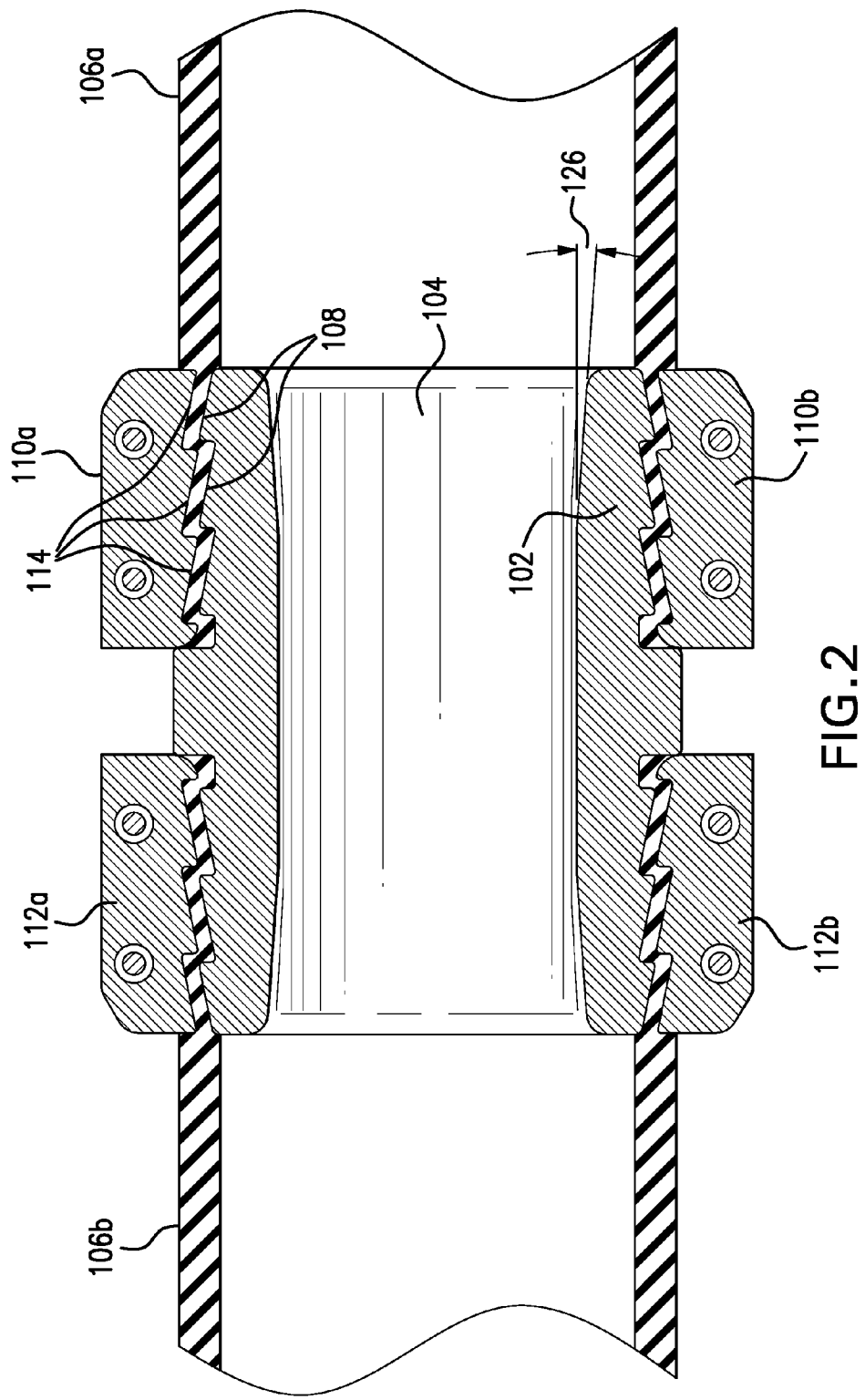
FIG. 2 is a cross-sectional view of the assembled hose coupling of FIG. 1B taken on the line 2-2 of FIG. 1B.

Referring to FIGS. 1-2, coupling 100 includes a sleeve 102 securable to first and second hose sections 106a, 106b, and defining a passage 104 between two opposing ends. Sleeve 102 exhibits bilateral (i.e. left and right) and equatorial (i.e. upper and lower) symmetry, and includes an outer surface characterized by three barbs 108 on opposite sides of an annular ring 109. Hose coupler 100 further includes two pairs of collars 110, 112. Each collar pair 110, 112 has an upper section 110a, 112a and a lower section 110b, 112b, respectively. Each upper section and lower section 110a, 112a and 110b, 112b, respectively, includes an inner surface characterized by three barbs 114 that corresponds to and cooperates with barbs 108 on sleeve 102. As shown in FIG. 2, when first and second hose sections 106a, 106b are fitted over their respective sides of sleeve 102, upper section and lower section 110a, 112a and 110b, 112b of collar pairs 110, 112, respectively, are clamped together by fasteners 116, and substantially surround each hose section 106a,b to secure hose sections 106a,b to sleeve 102.

Figure 3:
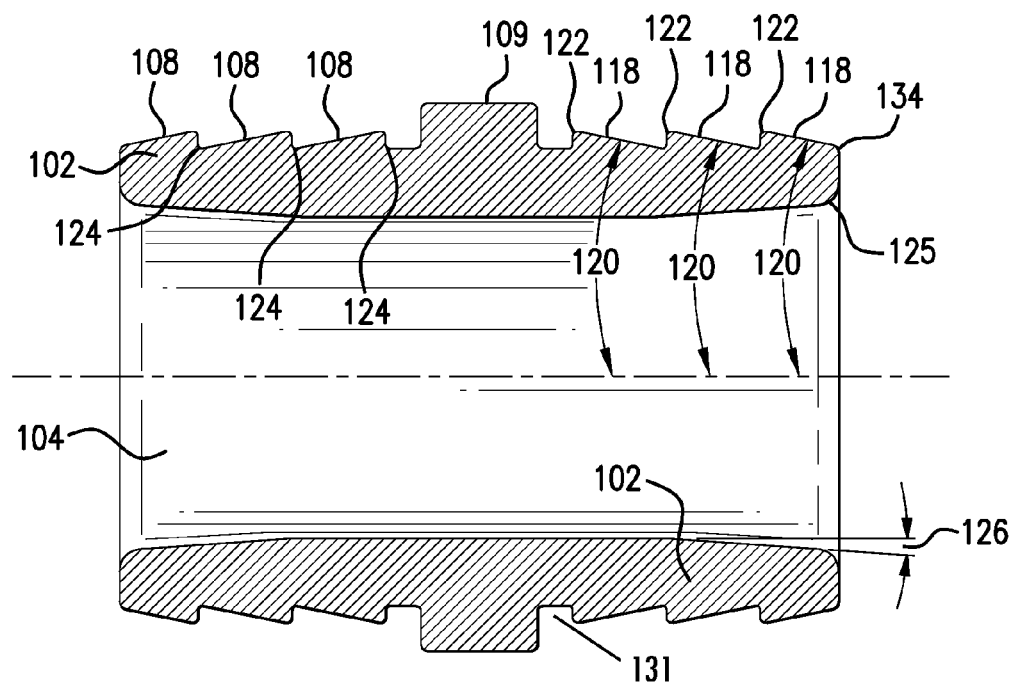
FIG. 3 is a cross-sectional view of the sleeve from FIG. 2.

Referring to FIG. 3, each barb 108 on sleeve 102 more specifically includes a tapered surface 118 at an angle 120 with respect to the equatorial axis. Tapered surface 118 is approximately 0.58 inches long on the first barb and 0.875 inches long on the second and third barbs, although these lengths can be increased or decreased. Angle 120 can be 15 degrees. Increasing angle 120, however, requires tapered surface 118 to be longer, which creates more surface area and a larger void for the inner diameter of the respective hose section 106a,b to fill when they are pulled tight. Increasing angle 120 pulls each hose section 106a,b away from annular ring 109, and thereby drawing up less hose onto sleeve 102. Decreasing angle 120 decreases the amount of pulling force required to separate the respective hose section 106a,b from sleeve 102. As such, the angle 120 is at least ten degrees or less than or substantially equal to twenty degrees and preferably between the range of 10 degrees and 20 degrees or any angle therebetween.

Each barb 108 further includes a radius 122 at its end that is preferably one-sixteenth of an inch, although radius 122 can be increased or decreased. Radius 122 allows each respective hose section 106a,b to slide more easily over each barb 108 onto sleeve 102. Radius 122 also accommodates variations in the inner diameter of the respective hose sections 106a, b, because a rounded surface makes it easier to slide each respective hose section 106a,b onto sleeve 102. A second radius 124 at the bottom of each barb 108 creates a smooth sealing surface between sleeve 102 and each respective hose section 106a,b and adds strength to barb 108 by removing stress points that could cause barb 108 to crack.

As best shown in FIG. 3, inner diameter of sleeve 102 defines passage 104. To reduce the turbulence of the fluid passing therethrough, an included angle 127 is provided at the outer ends of passageway 104 to ease the transition from each respective hose section 106a,b and passage 104. In sleeve 102. Included angle 127 is preferably four degrees with a 1½ inch setback that tapers down to a radius 125 on the end of sleeve 102. By reducing turbulence in the fluid, pressure inside sleeve 102 is reduced, and thereby minimizing the risk of the respective hose section 106a,b separating from sleeve 102.

Annular ring 109 on sleeve 102 functions as a hard stop for each respective hose section 106a,b as it is forced over barbs 108 on sleeve 102.

Figure 4:
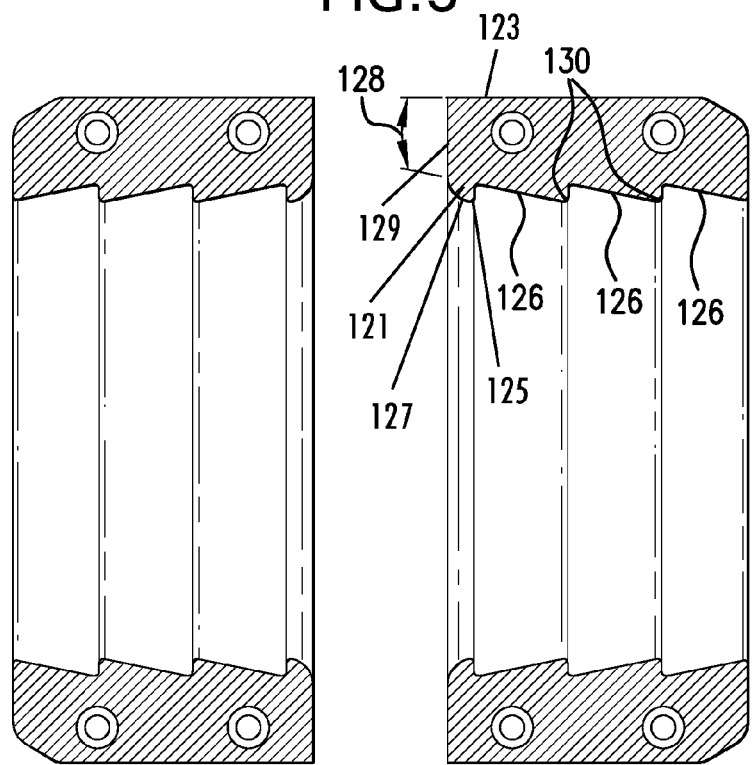
FIG. 4 is a cross-sectional view of the collars from FIG. 2.

Each upper section and lower section 110a, 112a and 110b, 112b of collar pairs 110, 112, respectively, has barbs 114 that cooperate with barbs 108 to clamp respective hose sections 106a,b to sleeve 102. As best seen in FIG. 4, each barb 114 has a tapered face 126 that is generally the same length as its corresponding tapered face 118 on barb 108 of sleeve 102. Each tapered face 126 also has an angle 128 that generally corresponds to angle 120 on barb 108. Each barb 114 also has a radius 130 that generally corresponds to radius 124 on barb 108. Each upper section and lower section 110a, 112a and 110b, 112b of collar pairs 110, 112 also has a protrusion 121 that projects inward with respect to an outer radial surface 123. Protrusion 121 has a convex surface 127 that extends from an end surface 129 to a radius 125, wherein the radius 125 is dimensioned less than a radius of the convex surface 127. The corresponding dimensions between barbs 108 and 114 allow collar pairs 110, 112 to be pressed down on the respective hose sections 106a,b in a manner that allows barbs 108 and 114 to align generally so that the respective hose sections 106a,b are not damaged or cut. Protrusion 121 is also pressed down on the respective hose sections 106a,b in a manner that allows protrusion 121 to extend inward toward a recessed space 131 between annular ring 109 and barb 118 that is the closest to annular ring 109.

Each upper section and lower section 110a, 112a and 110b, 112b of collar pairs 110, 112, respectively, are held together by fasteners 116. Each of the collar pairs 110, 112 has corresponding holes 132 for receiving fasteners 106. Fasteners 106 can be a bolt that engages a threaded portion on one of upper section or lower section 110a, 112a and 110b, 112b of collar pairs 110, 112, respectively, or any other type of fastener for holding collar pairs 110, 112 together and clamped over the respective hose sections 106a, b.

Hose coupler 100 is designed such that the harder the respective hose sections 106a,b are pulled away from each other the stronger the connection between the respective hose sections 106a,b and sleeve 102 becomes. As the respective hose sections 106a,b are pulled outward away from each other, the inner diameter of the respective hose sections 106a,b is stretched inward toward barbs 108 of sleeve 102 filling the void between each barb 108, and thereby placing more surface area of the respective hose sections 106a,b in contact with sleeve 102 in order to increase the frictional force holding the respective hose sections 106a,b to sleeve 102. The considerable surface area each barb 108 has in contact with the inner diameter of the respective hose sections 106a,b also substantially eliminates leakage in coupler 100.

In prior art designs the primary holding force attaching the coupler to the respective hose sections 106a,b is a clamping or pressure force from between the collars and the sleeve. In the present disclosure, however, the primary holding force attaching coupler 100 to the respective hose sections 106a,b are barbs 108 on sleeve 102. This means the fluid seal is not dictated by the clamping force, rather it is a frictional seal between barb 108 and the respective hose sections 106a, b. This creates a better and more permanent seal that is not likely to deteriorate over time as fasteners 116 holding collars 110, 112 to sleeve 102 loosen. In fact, invention could be used without collars 110, 112 applying pressure force to hold the respective hose sections 106a,b to sleeve 102.

A further advantage of having barbs 108 on sleeve 102 function as the primary sealant is that the number of components in coupler 100 is greatly reduced. The present invention has five components, sleeve 102 and upper section and lower sections 110a, 112a and 110b, 112b of collar pairs 110, 112.

Furthermore, the ease of assembly of the invention is primarily dictated by the ease at which the respective hose sections 106a,b are slid onto sleeve 102. Smooth surfaces throughout sleeve 102, including a radius 134 on the front end of the first barb 108 and radii 122 on the upper end of each barb 108, allows the respective hose sections 106a,b to easily slide up sleeve 102. Furthermore, the present invention is primarily suited for use with draghose manure application, as such the fluid through the hose acts as a lubricant making sliding the respective hose sections 106a,b on to sleeve 102 easier.

Coupler 100 can be manufactured to couple any size of hose; however, hoses in draghose manure applications typically come in the 4.5", 5", 5.5" or 6" size. Coupler 100 is easily scaled up or down to meet the needed size. Typically, only the diameter dimensions are changed, and the angular dimensions as well as the dimensions of barbs 108 remain constant. In the preferred embodiment, coupler 100 is made of anodized aluminum because it is corrosive resistant and able to withstand the toxic environment of manure handling operations.

In accordance with another embodiment of the present invention, a removable hose coupler 200 is provided, which allows a single operator to remove quickly or connect a hose with a hose real or pumping unit. An exemplary embodiment of hose coupler 200 according to the present disclosure is illustrated in the FIGS. 5A and 5B.

Figure 5A:
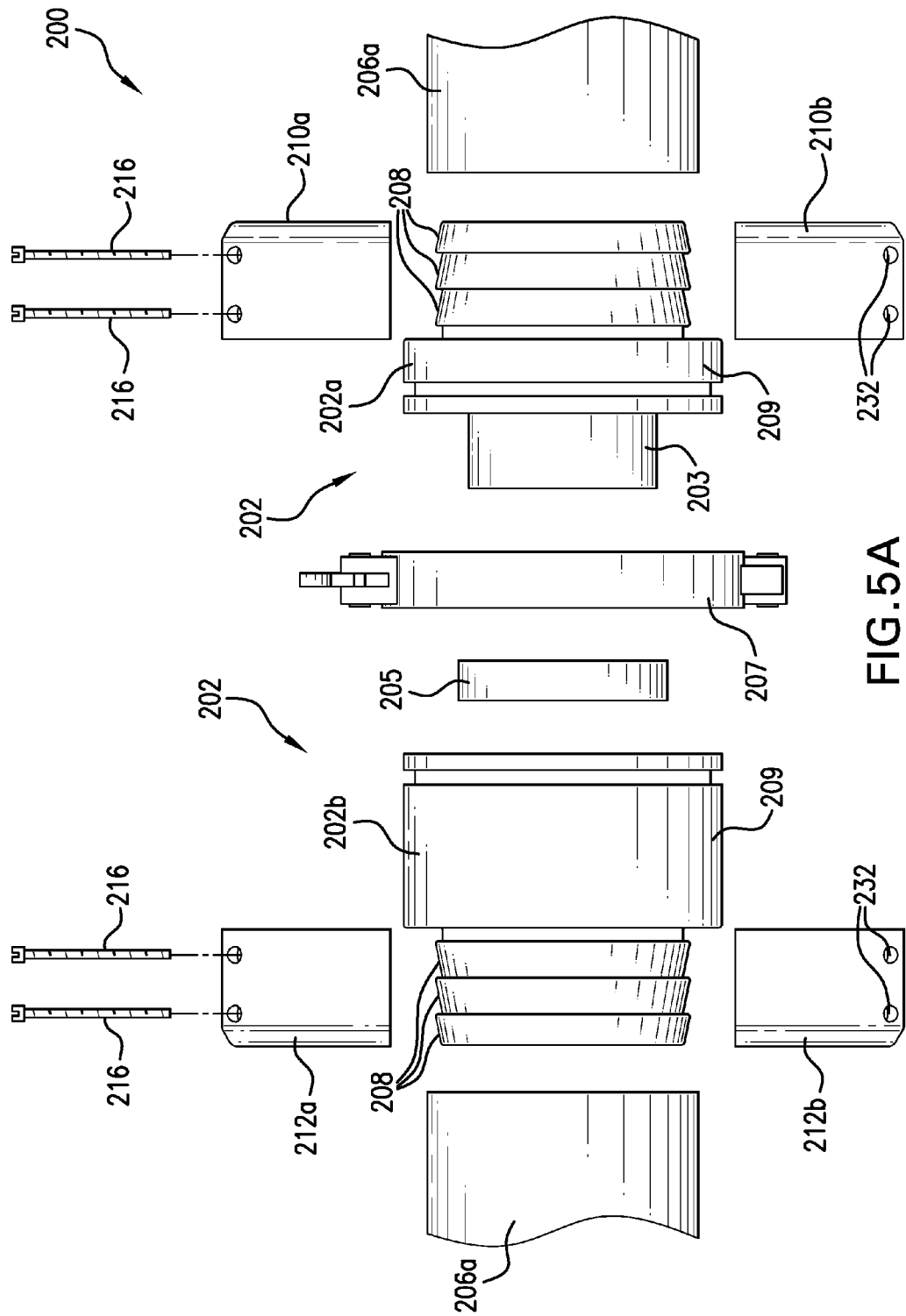
FIG. 5A is a side view of a hose coupler according to the present invention during an initial stage of assembly.

Referring to FIG. 5A, coupler 200 includes a sleeve 202 securable to first and second hose sections 206a and 206b, and defining a passage 204 between two opposing ends. Sleeve 202 comprises a first and a second sleeve sections 202a and 202b, respectively, and includes an outer surface characterized by three barbs 208 on opposite sides of an annular ring 209.

Figure 5B:
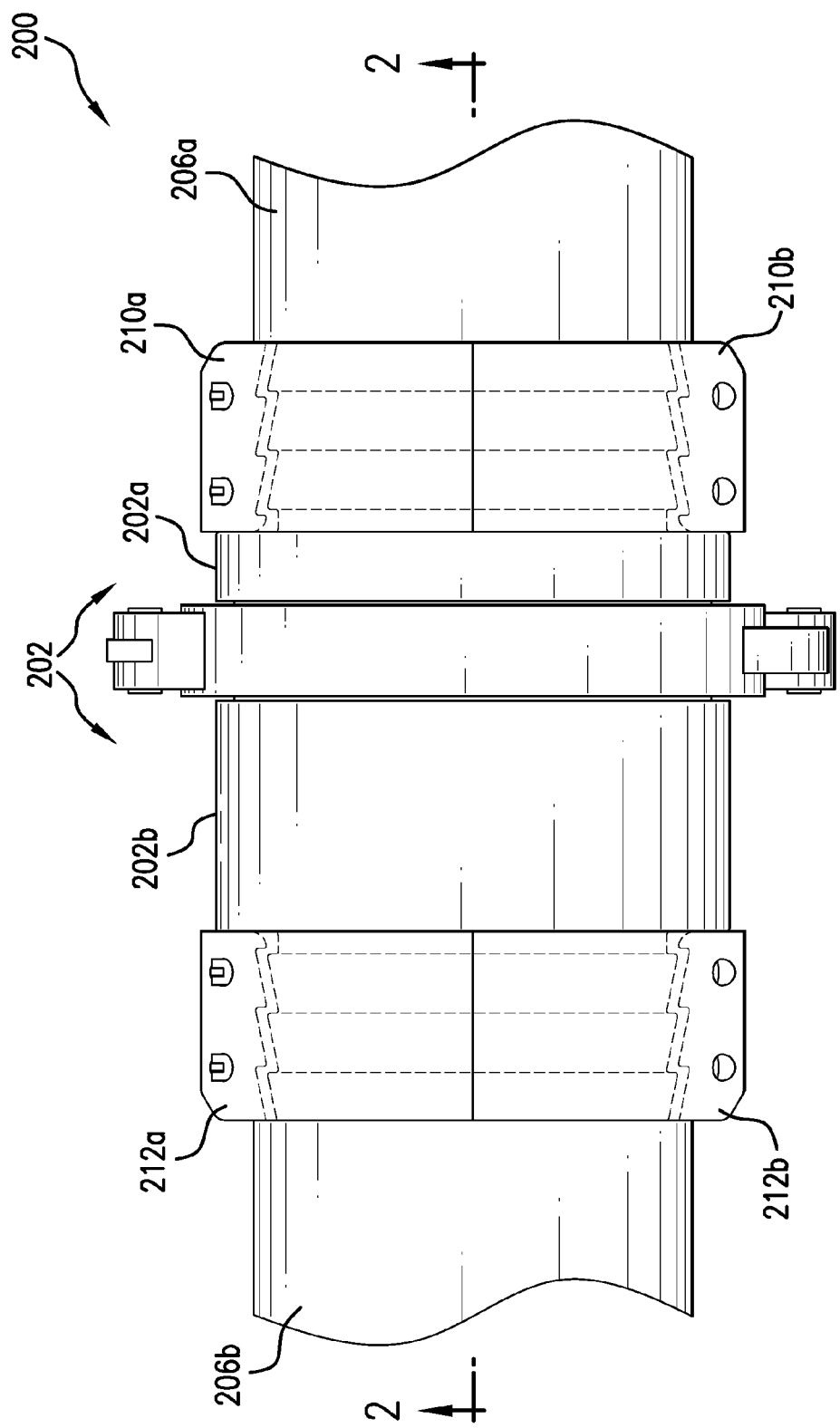
FIG. 5B is a side view of the hose coupler of FIG. 5A during a final stage of assembly.
Figure 8:
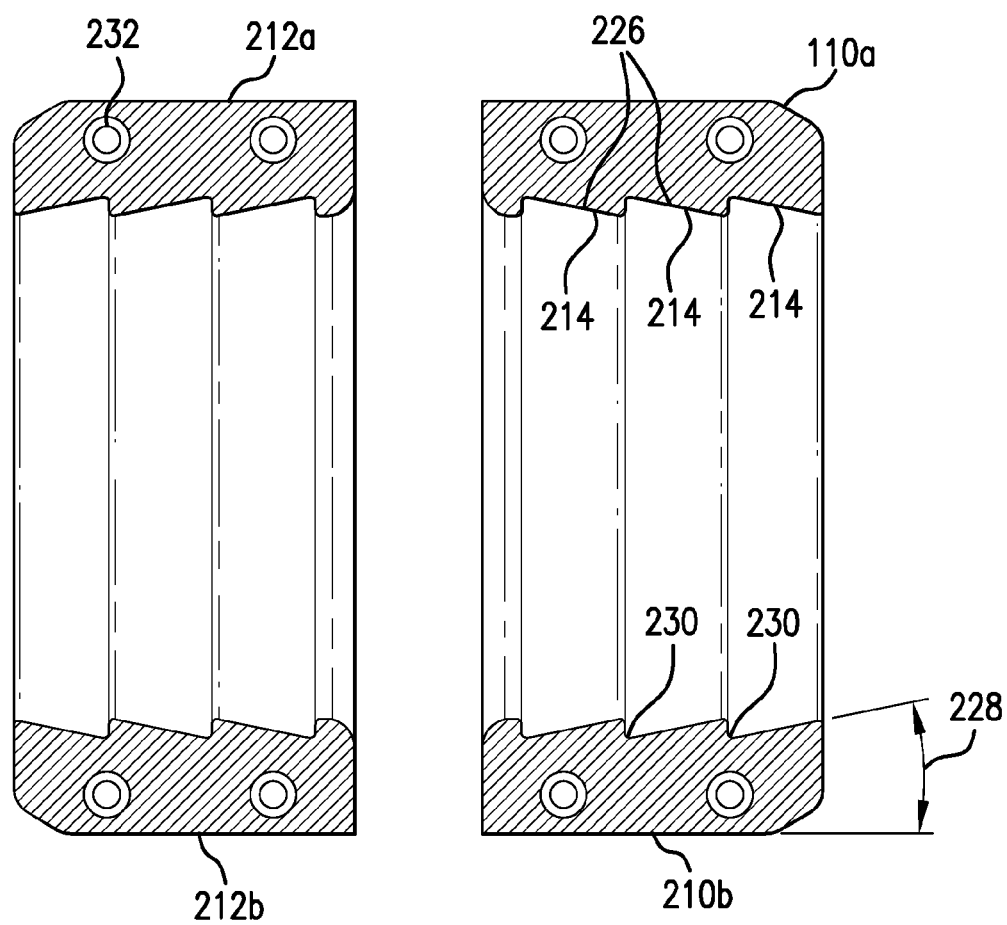
FIG. 8 is a cross-sectional view of the collars from FIG. 6.

Referring to FIG. 8, hose coupler 200 further includes two pairs of collars 210, 212. Each collar pair 210, 212 has an upper section 210a, 212a and a lower section 210b, 212b, respectively. Each upper section and lower section 210a, 212a and 210b, 212b, respectively, includes an inner surface characterized by three barbs 214 that corresponds to and cooperates with barbs 208 on sleeve 202. As shown in FIG. 5B, when first and second hose sections 206a and 206b are fitted over their respective sides of sleeve sections 202a and 202b, upper section and lower section 210a, 212a and 210b, 212b of collar pairs 210, 212, respectively, are clamped together by fasteners 216, and substantially surround each hose section 206a and 206b to secure hose sections 206a and 206b to sleeve 202.

Figure 9:
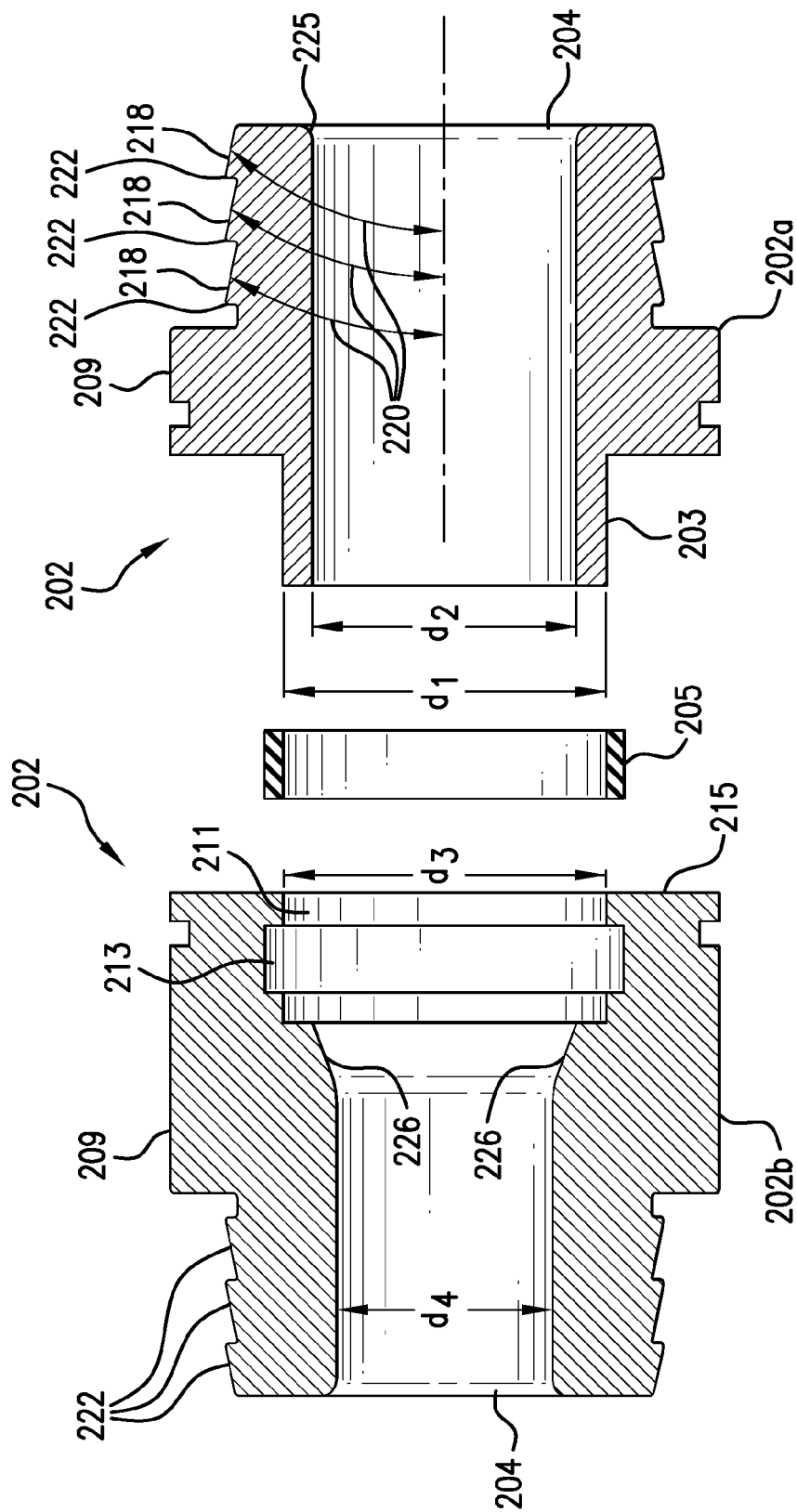
FIG. 9 is a cross-sectional view of the sleeve from FIG. 6A.

Referring to FIG. 9, each barb 208 on sleeve 202 more specifically includes a tapered surface 218 at an angle 220 with respect to the equatorial axis. Tapered surface 218 is approximately 0.58 inches long on the first barb (the rightmost barb on FIG. 9) and 0.875 inches long on the second and third barbs, although these lengths can be increased or decreased. Angle 220 can be 15 degrees. Increasing angle 220, however, requires tapered surface 218 to be longer, which creates more surface area and a larger void for the inner diameter of the respective hose section 206a and 206b to fill when they are pulled tight. Increasing angle 220 pulls each hose section 206a and 206b away from annular ring 209, and thereby drawing up less hose onto sleeve 202. Decreasing angle 220 decreases the amount of pulling force required to separate the respective hose section 206a and 206b from sleeve 202. As such, the angle 220 is at least ten degrees or less than or substantially equal to twenty degrees and preferably between the range of 10 degrees and 20 degrees or any angle therebetween.

Each barb 208 further includes a radius 222 at its end that is preferably one-sixteenth of an inch, although radius 222 can be increased or decreased. Radius 222 allows each respective hose section 206a and 206b to slide more easily over each barb 208 onto sleeve 202. Radius 222 also accommodates variations in the inner diameter of the respective hose sections 206a and 206b, because a rounded surface makes it easier to slide each respective hose section 206a and 206b onto sleeve 202. A second radius 224 at the bottom of each barb 208 creates a smooth sealing surface between sleeve 202 and each respective hose section 206a and 206b and adds strength to barb 208 by removing stress points that could cause barb 208 to crack.

Annular ring 209 on sleeve 202 functions as a hard stop for each respective hose section 206a and 206b as it is forced over barbs 208 on sleeve 202.

Referring back to FIG. 8, each upper section and lower section 210a, 212a and 210b, 212b of collar pairs 210, 212, respectively, has barbs 214 that cooperate with barbs 208 to clamp respective hose sections 206a and 206b to sleeve 202. Each barb 214 has a tapered face 226 that is generally the same length as its corresponding tapered face 218 on barb 208 of sleeve 202. Each tapered face 226 also has an angle 228 that generally corresponds to angle 220 on barb 208. Each barb 214 also has a radius 230 that generally corresponds to radius 224 on barb 208. The corresponding dimensions between barbs 208 and 214 allow collar pairs 210, 212 to be pressed down on the respective hose sections 206a and 206b in a manner that allows barbs 208 and 214 to align generally so that the respective hose sections 206a and 206b are not damaged or cut.

Each upper section and lower section 210a, 212a and 210b, 212b of collar pairs 210, 212, respectively, are held together by fasteners 216. Each of the collar pairs 210, 212 has corresponding holes 232 for receiving fasteners 216. Fasteners 216 can be a bolt that engages a threaded portion on one of the upper section or lower section 210a, 212a and 210b, 212b of collar pairs 210, 212, respectively, or any other type of fastener for holding collar pairs 210, 212 together and clamped over the respective hose sections 206a and 206b.

Figure 6A:
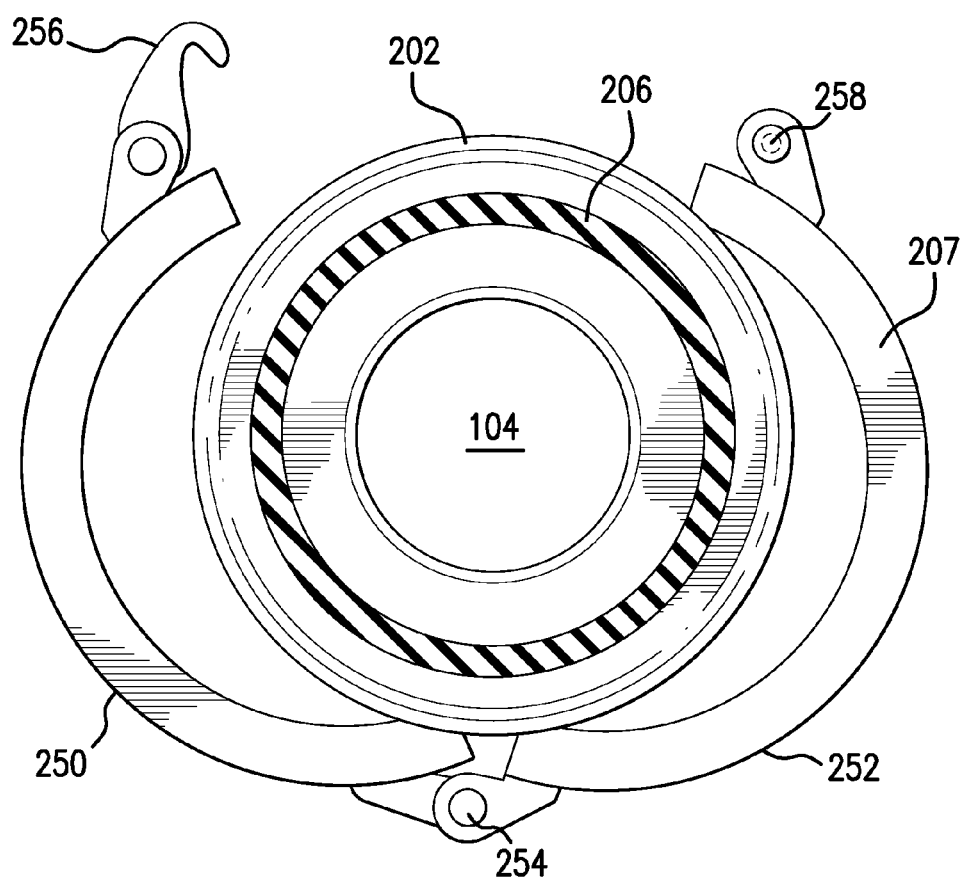
FIG. 6A is a front view of the hose coupler of FIG. 5A with a clamp in an unlocked position.
Figure 6B:
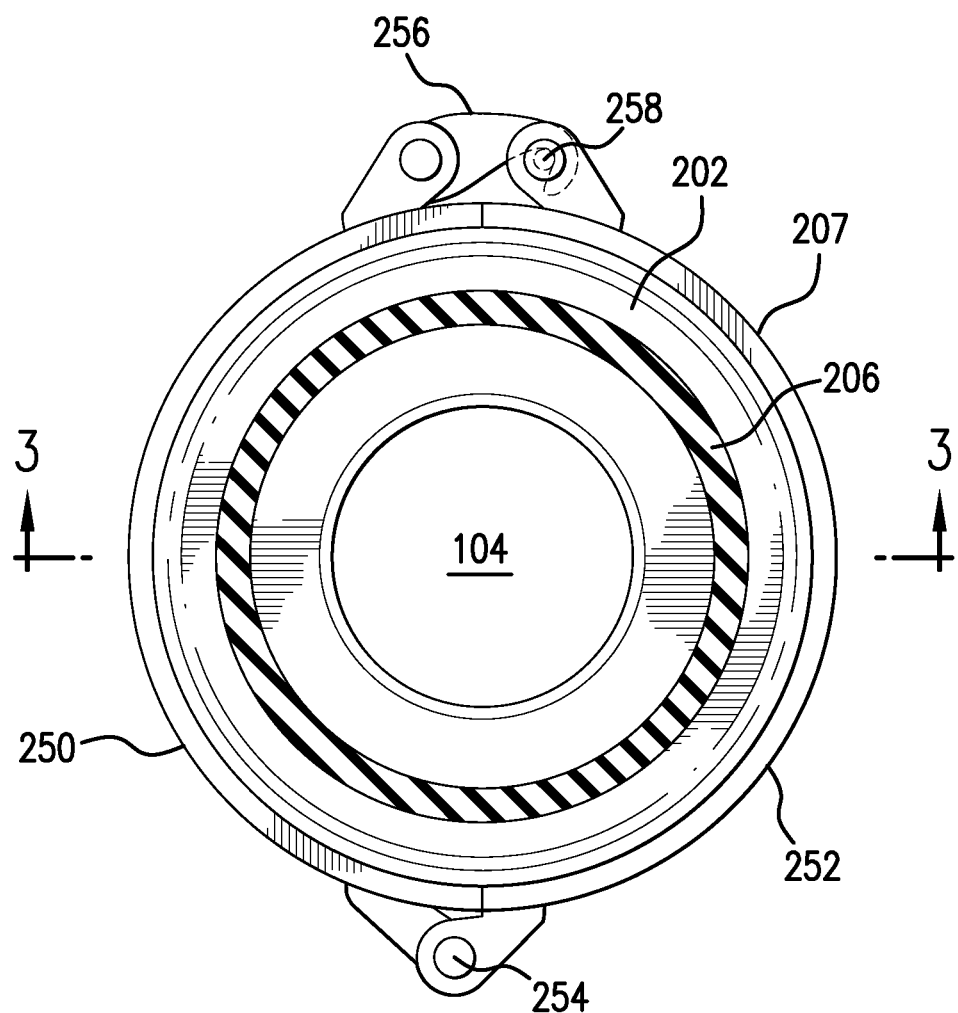
FIG. 6B is a front view of the hose coupler of FIG. 5A with the clamp in the locked position.

Returning to FIG. 9, after the respective hose sections 206a and 206b are secured to respective sleeve sections 202a and 202b, sleeve sections 202a and 202b can be connected together. Sleeve section 202a has a male portion 203 that corresponds with a female portion 211 of sleeve section 202b. A clamp 207 (shown in FIGS. 6A and 6B) is provided to secure sleeve sections 202a and 202b together. FIG. 6A shows clamp 207 in an unclamped position surrounding sleeve 202, while FIG. 6B shows clamp 207 in a clamped position around sleeve 202. Clamp 207, includes a first arm 250 and a second arm 252 connected together by a pivot pin 254. First arm 250 has a clasp 256 that hooks over and engages a pin 258 on second arm 252. One skilled in the art would recognize that any type of clamping mechanism can be used to hold sleeve sections 202a and 202b together.

More specifically, as shown in FIG. 9, sleeve section 202a has male portion 203 adjacent to annular ring 209. Male portion 203 has an outer diameter d1 and an inner diameter d2. Diameter d2 defines passage 204 through sleeve section 202a. Passage 204 has a substantially constant diameter throughout (except for a radius 225 that is provided to provide a smooth surface to avoid stress cracks an ease the transition from hose 206 to sleeve 202) in order to provide a small amount of backpressure to hold a seal 205 in its position in female portion 211 of sleeve section 202b when the respective sleeve sections 202a and 202b are clamped together. Male portion 203 is generally 2.25 inches long with a diameter of approximately 5.6 inches around, which corresponds to the dimensions of female portion 211 of sleeve section 202b. In this regard, male portion 203 is integral with sleeve 202a.

Female portion 211 has an inner diameter d3 substantially the same as outer diameter d1 of male portion 203 of sleeve section 202a. An annular groove 213 is formed in passage 204 of female portion 211 offset from an outer surface 215. Annular groove 213 has a diameter greater than inner diameter d3 of female portion 211, and is sized to receive seal 205. Seal 205 creates a fluid seal between the respective sleeve sections 202a and 202b so fluid does not leak out.

When the respective sleeve sections 202a and 202b are combined, male portion 203 extends into sleeve section 202b about 2.25 inches, which corresponds with the length of male portion 203 of sleeve section 202a. Having sleeve section 202a integral with male portion 203 removes the need of a separate sleeve between sleeve sections 202a and 202b, such separate sleeves are found often in prior art couplers. Because separate pieces of the coupler tend to get lost in the field, it is advantageous to integrate components together, when possible. In an alternative embodiment, seal 205 is fixed inside annular groove 213 and clamp 207 can be permanently attached to one of sleeve sections 202a and 202b, in this regard, there are no separate pieces that can get lost.

Figure 7:
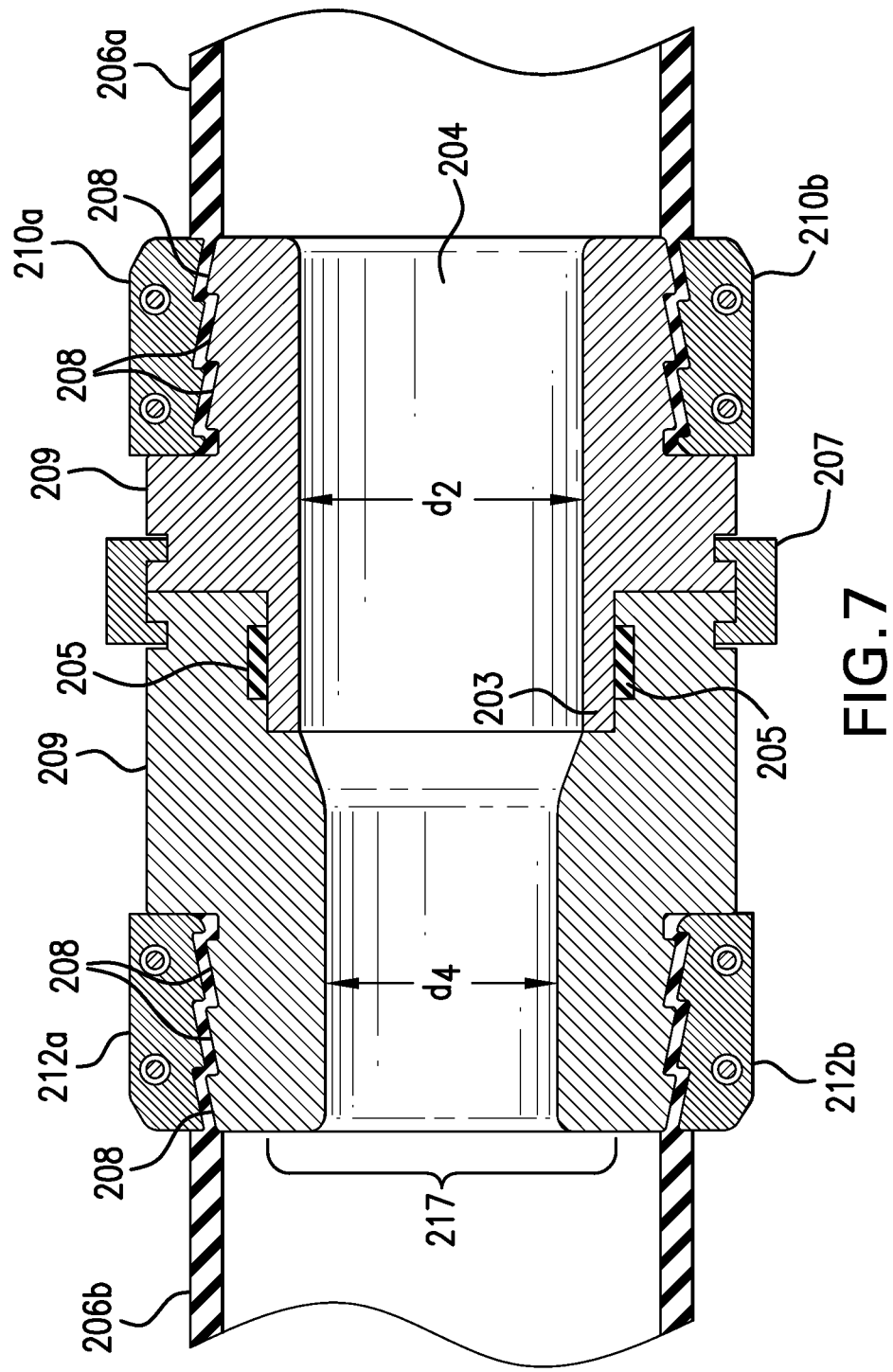
FIG. 7 is a cross-sectional view of the assembled hose coupling of FIG. 5B taken on the line 2-2 of FIG. 5B.

FIG. 7 shows coupler 200 with the respective sleeve sections 202a and 202b attached to respective hose sections 206a and 206b and clamped together with clamp 207. As previously stated, passage 204 is defined by a diameter d2 in sleeve section 202a and by a diameter d4 in sleeve section 202b. To reduce the turbulence of the fluid passing through sleeve section 202a to sleeve section 202b, or the other way around, an included angle 226 provides a transition between d2 and d4 in passage 204. Included angle 226 is preferably thirty degrees, within +/−1 degree (or any range therebetween). By reducing turbulence in passage 204 where d2 transitions to d4 the fluid, pressure inside sleeve 202 is reduced, and thereby minimizing the risk of damaging seal 205.

Hose coupler 200 is designed such that the harder the respective hose sections 206a and 206b are pulled away from each other the stronger the connection between the respective hose sections 206a and 206b and sleeve 202 becomes. As the respective hose sections 206a and 206b are pulled outward away from each other, the inner diameter of the respective hose sections 206a and 206b is stretched inward toward barbs 208 of sleeve 202 filling the void between each barb 208, and thereby placing more surface area of the respective hose sections 206a and 206b in contact with sleeve 202 in order to increase the frictional force holding the respective hose sections 206a and 206b to sleeve 202. The considerable surface area each barb 208 has in contact with the inner diameter of the respective hose sections 206a and 206b also substantially eliminates leakage in coupler 200.

In prior art designs the primary holding force attaching the coupler to the respective hose sections 206a and 208b is a clamping force from between the collars and the sleeve. In the present invention, however, the primary holding force attaching coupler 200 to the respective hose sections 206a and 206b are barbs 208 on sleeve 202. This means the fluid seal is not dictated by the clamping force; rather it is a frictional seal between barb 208 and the respective hose sections 206a and 206b. This creates a better and more permanent seal that is not likely to deteriorate over time as fasteners 216 holding collars 210, 212 to sleeve 202 loosen. In fact, this embodiment could be used without collars 210, 212 holding the respective hose sections 206a and 206b to sleeve 202.

A further advantage of having barbs 208 on sleeve 202 functions as the primary sealant is to greatly reduce the number of components in coupler 200. The present embodiment has five components, sleeve 202 and upper section and lower sections 210a, 212a and 210b, 212b of collar pairs 210, 212.

Furthermore, the ease of assembly of this embodiment is primarily dictated by the ease at which the respective hose sections 206a and 206b are slid onto sleeve 202. Smooth surfaces throughout sleeve 202, including a radius 234 on the front end of the first barb 208 and radii 222 on the upper end of each barb 208, allows the respective hose sections 206a and 206b to slide easily up sleeve 202. Furthermore, the embodiment is primarily suited for use with draghose manure application, as such the fluid through the hose acts as a lubricant making sliding the respective hose sections 206a and 206b on to sleeve 202 easier.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A coupler for connecting to a hose, the coupler comprising:
    a sleeve having a first side and a second side each contiguous with an annular ring and the sleeve having an equatorial axis and a passageway between a first hose section for being drawn up to abutment with the first side to the annular ring and a second hose section for being drawn up to abutment with the second side of the annular ring, the sleeve including a plurality of barbs on each of the first side and the second side, the plurality of barbs each having a tapered surface that is at an angle of at least ten degrees and less than or substantially equal to twenty degrees with respect to the equatorial axis, wherein the passageway in the sleeve on each side of the sleeve and each side of the equatorial axis has a radius at an outermost end surface that extends from the outermost end surface into the passageway to an included angle taper; and
    a collar including a plurality of barbs each having a tapered surface that is at an angle corresponding to the angle of the tapered surface of the barbs on the sleeve, and a protrusion projecting inward with respect to an outer radial surface, the protrusion having a convex surface extending from an outermost end surface to a radius, wherein the radius is dimensioned less than a radius of the convex surface, the collar being adapted to substantially surround the first hose section disposed over the plurality of the barbs on the sleeve and the tapered surface of each barb on the sleeve generally aligns with the tapered surface of each barb on the collar and the protrusion extends inward with respect to an outer diameter of the annular ring toward a recessed space between the annular ring of the sleeve and the barb of the sleeve closest to the annular ring for pressing down the hose section into the recessed space.

2. The coupler of claim 1, wherein each of the plurality of barbs on the sleeve has a radius at an upper diameter with respect to the passageway that is 1/16 of an inch.

3. The coupler of claim 1, wherein the included angle is four degrees with a 1.5 inch setback.

4. The coupler of claim 1, and further comprising three barbs on each of two sides of the sleeve.

5. The coupler of claim 4, and further comprising two collars corresponding to each of two sides of the sleeve, wherein each collar has three barbs.

6. The coupler of claim 1, wherein the sleeve is a first sleeve section defined by the plurality of barbs and a male end portion separated by an annular ring.

7. The coupler of claim 1, wherein each barb further comprises an edge perpendicular to the equatorial axis.

8. The coupler of claim 7, and further comprising a first radius connecting the edge of a first barb with a beginning of the tapered surface of the next barb.

9. The coupler of claim 8, and further comprising a second radius connecting an end of the tapered surface with the edge.

10. The coupler of claim 1, wherein the barbs each have a tapered surface that is at an angle of substantially fifteen degrees with respect to the equatorial axis.

* * * * *